US008108526B2

(12) United States Patent
Yan (10) Patent No.: US 8,108,526 B2
(45) Date of Patent: Jan. 31, 2012

(54) COMMUNICATION METHOD AND DEVICE FOR PREVENTING MEDIA STREAM CIRCUITRY

(75) Inventor: Jun Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1146 days.

(21) Appl. No.: 11/469,796

(22) Filed: Sep. 1, 2006

(65) Prior Publication Data

US 2007/0097999 A1    May 3, 2007

(30) Foreign Application Priority Data

Sep. 2, 2005    (CN) .......................... 2005 1 0098546

(51) Int. Cl.
*G06F 15/16* (2006.01)
(52) U.S. Cl. .................... 709/227; 709/228; 709/248
(58) Field of Classification Search .................. 709/227, 709/228, 248
See application file for complete search history.

(56) References Cited

U.S. PATENT DOCUMENTS

| | | | |
|---|---|---|---|
| 6,693,894 B1 | 2/2004 | Andersson et al. | |
| 7,302,496 B1* | 11/2007 | Metzger ........................ | 709/245 |
| 7,411,975 B1* | 8/2008 | Mohaban ....................... | 370/466 |
| 7,480,305 B1* | 1/2009 | Somasundaram ............. | 370/401 |
| 7,760,744 B1* | 7/2010 | Mohaban ....................... | 370/401 |
| 7,782,897 B1* | 8/2010 | Mohaban ....................... | 370/466 |
| 2005/0102421 A1* | 5/2005 | Horvath et al. ............... | 709/238 |
| 2007/0019619 A1* | 1/2007 | Foster et al. .................. | 370/352 |
| 2007/0140223 A1* | 6/2007 | Bhatia et al. .................. | 370/352 |
| 2007/0253418 A1* | 11/2007 | Shiri et al. .................... | 370/392 |
| 2007/0263802 A1* | 11/2007 | Allen ............................ | 379/93.01 |
| 2008/0070573 A1* | 3/2008 | Dutta et al. ................... | 455/435.1 |
| 2010/0254401 A1* | 10/2010 | O'Neill ......................... | 370/428 |

FOREIGN PATENT DOCUMENTS

| | | |
|---|---|---|
| CN | 1338177 | 2/2002 |
| CN | 1474566 A | 4/2004 |
| CN | 1738267 | 2/2006 |

(Continued)

OTHER PUBLICATIONS

Aoun et al; "Identifying intra-realm calls and avoiding media tromboning"; Feb. 2002; IETF; MIDCOM working group draft 00; pp. 1-10.*

(Continued)

*Primary Examiner* — Glenton B Burgess
*Assistant Examiner* — Jeffrey Nickerson
(74) *Attorney, Agent, or Firm* — Conley Rose, P.C.; Grant Rodolph (57) ABSTRACT

A communication method and device for preventing the media stream circuitry. The method includes the following steps: a signaling layer control function entity at the calling party side obtains the called party side information; the signaling layer control function entity routes the session signaling and controls the establishment of the media stream path, and when the signaling layer control function entity determines that the network where it is located can be inter-connected directly with the network where the called party is located according to the called party side information, the signaling layer control function entity gives up the interaction with the media layer gateway function entity for the network address port translation. A network device for guaranteeing that the communication between media layers of the calling and called party communication entities can be performed in the shortest path is also provided.

32 Claims, 7 Drawing Sheets

FOREIGN PATENT DOCUMENTS

| | | |
|---|---|---|
| EP | 1427235 A1 | 9/2004 |
| WO | WO 2005/046182 A | 5/2005 |

OTHER PUBLICATIONS

European Search Report for EP 06 11 9909.7, dated Feb. 1, 2007.
Foreign communication from a counterpart application, Chinese application 200510098546.6, Partial English Translation Office Action dated Jul. 4, 2008, 6 pages.
Foreign communication from a counterpart application, PCT application PCT/CN2006/001325, International Search Report dated Oct. 19, 2006, 4 pages.
Foreign communication from a counterpart application, PCT application PCT/CN2006/001325, English Translation Written Opinion dated Oct. 19, 2006, 6 pages.

* cited by examiner

COMMUNICATION METHOD AND DEVICE FOR PREVENTING MEDIA STREAM CIRCUITRY

RELATED APPLICATIONS

This patent application makes reference to, claims priority to and claims benefit from Chinese Patent Application No. 200510098546.6 filed on Sep. 2, 2005, which is explicitly incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to a media stream transfer technology in the communication field, especially to a communication method and device for preventing media stream circuitry.

In a packet network, particularly in an IP network, the media stream can directly reach the opposite network by the self-addressing characteristic of the IP network to realize the end-to-end communication. Different from signaling, the media stream is not required to be transferred through many session control function entities. However, in the traditional network, in view of the IP address shortage or security, different networks adopt different address domains, even different address formats, such as IPv4 or Ipv6, which results in that two terminals in communication can not address the counterpart directly, so that a network address port translation (NAPT) gateway is needed for translation.

When a calling party is communicating with a called party through a plurality of networks, since the calling party does not know which network the called party is located in at the time of sending the calling request, a plurality of NAPT gateways may be needed for translation during the session establishment procedure so as to realize the media stream connection between the calling party and the called party (when the address domains are different, a NAPT gateway is needed between each two networks for translation).

Figure 1:
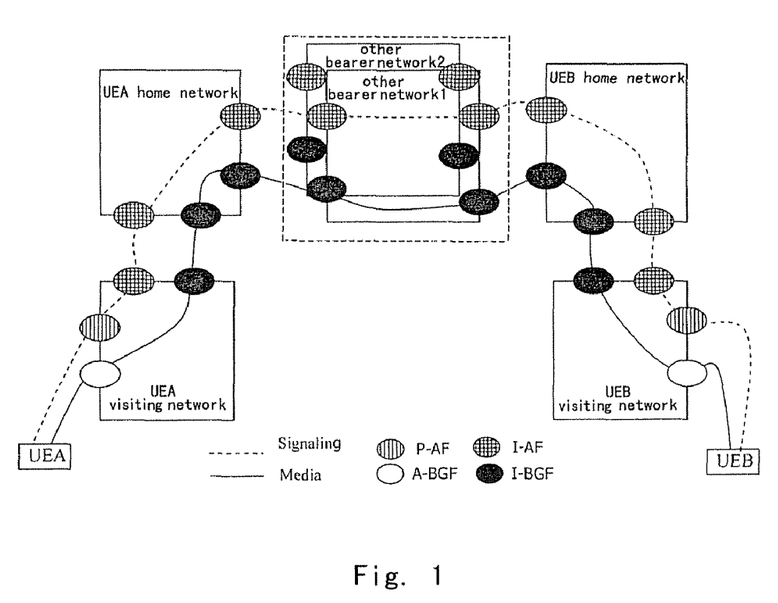
FIG. 1 is a schematic diagram showing an NAPT for a media stream between calling and called parties during a traditional session establishment procedure.

As shown in FIG. 1, P-AF (Proxy Application Function) represents an application function entity between the access network and the core network, such as the P-CSCF (Proxy Call Session Control Function) in the IMS (Internet Multimedia Subsystem) network.

I-AF (Inter-working Application Function) represents an application function entity for controlling the media layer translation between different core network domain boarders, such as the I-BCF (Inter-working Border Control Function) in the network architecture defined in the TISPAN or ITU-T.

Generally, the P-AF and I-AF represent the signaling layer boarder control function entities.

A/I-BGF (Access Border Gateway Function/Inter-working Border Gateway Function) represents media layer boarder gateway function entities, wherein A represents the place between the access and core networks, I represents the place between different core network domains, the BGF represents the boarder gateway with the NAPT (Network Address Port Translation) function.

As shown in FIG. 1, when the user terminal UE A communicates with the UE B, the communication passes a plurality of networks. Since the address domains of different networks are different, a plurality of BGFs are used for the NAPT translation so as to realize the media stream connection.

In practice, if the bearer network where the user terminal UE A is located can be inter-connected with the bearer network where the user terminal UE B is located, (even if the bearer networks where the user terminals UE A and UE B are located cannot be inter-connected with other middle network domains, these two networks can be inter-connected with each other), the media stream between the UE A and UE B does not need to pass so many BGFs for the NAPT translation.

In addition, in a future packet network, users can be nomadic among different place. If one user subscribes to an operator at site A, the user may access the service network through the IP network or the wireless access network at site B and continue to use services provided by the subscribing place, i.e. the site A. In 3GPP IMS network and in the network architecture defined by the ITU-T and TISPAN, the home subscriber server implements the user's session control. Since the calling party does not know the location of the called party and its bearer network situation when initiating the session (that is, whether the bearer networks of the calling party and the called party are in the same address domain or whether direct addressing can be used), and once some middle bearer networks cannot be inter-connected directly, the NAPT gateway is needed for translation, the traditional session establishment model is bounded the media connection with signaling establishment procedure. For example, when the signaling is passing through some P-AF/I-AF, the media stream will pass through the A/I-BGF. Thus, when the address domains of the bearer networks of locations A and B are different, and a user of location A, who is now at location B, calls a user of location B, the media stream has to return to location A from location B and then to return to location B again for communicating with the called party of location B according to the above model, which results in that the communication between two users, who are actually at location B, has to be in a sequence of from location B to location A-to location B, and has to pass many BGFs for the NAPT translation.

There are many other scenarios of media stream circuitry. The media stream circuitry influences the quality of media stream, results in long transmission time of packets in the network and large delay. If the media stream passes many networks, the uncertainty of the transmission quality increases the uncertainty of the media stream service quality.

BRIEF SUMMARY OF THE INVENTION

The present invention provides a communication method and device for preventing media stream circuitry, which solves the problem in the related art that the media stream service quality is affected due to the media stream circuitry.

In accordance with one embodiment of the present invention, the communication method for preventing media stream circuitry includes the steps of: obtaining called party side information by a signaling layer control function entity at a calling party side; routing a session signaling, and, when determining that a bearer network where the signaling layer control function entity is located can directly be inter-connected with a bearer network where a called party is located according to the called party side information, giving up an interaction with a media layer gateway function entity for a network address port translation by the signaling layer control function entity.

According to the above method, when determining that the bearer network where the signaling layer control function entity is located can directly be inter-connected with the bearer network where the called party is located, subsequent signaling layer control function entities in a session signaling path can be indicated to give up the interaction with the media layer gateway function entity for the network address port translation by the signaling layer control function entity at the calling party side.

The step of obtaining the called party side information by the signaling layer control function entity at the calling party side can include the steps of: routing an initial session signaling directly to the network entity where the called party is located, avoiding to establish the media stream path temporarily during the process; and obtaining the called party side information according to the returned response message.

In accordance with another embodiment, the present invention provides a communication method for preventing media stream circuitry that includes the steps of: obtaining called party side information by a first signaling layer control function entity at a calling party side access domain; obtaining information of a second signaling layer control function entity at a called party side access domain from the called party side information; judging whether the first signaling layer control function entity and the second signaling layer control function entity belong to a same bearer domain by the first signaling layer control function entity; if they belong to the same bearer domain, the method proceeding to the next step, if they do not belong to the same bearer domain, the first signaling layer control function entity determining whether to perform the network address port translation according to the registered information of the calling party and performing the corresponding subsequent procedures; and routing a session signaling and indicating subsequent signaling layer control function entities to give up an interaction for a network address port translation with a media layer gateway function entity by the first signaling layer control function entity at the calling party side access domain.

In the above method, in the step of routing the session signaling and indicating subsequent signaling layer control function entities to give up an interaction for a network address port translation with a media layer gateway function entity, the first signaling layer control function entity can further determine whether the calling party and the called party can be inter-connected directly by the first signaling layer control function entity. If they can be inter-connected directly, the interaction for the network address port translation with the media layer gateway function entity by the first signaling layer control function entity at the calling party side access domain is giving up; if they can not be inter-connected directly, the first signaling layer control function entity can determine whether to perform the network address port translation according to the registered information of the calling party by the first signaling layer control function entity at the calling party side access domain.

The method can further include the following steps before the step of obtaining called party side information by the first signaling layer control function entity at the calling party side access domain: querying whether the called party is registered in the first signaling layer control function entity according to a called party's identification in a session request; proceeding to the next step if the called party is registered, and proceeding to obtain the called party side information by the first signaling layer control function entity at the calling party side access domain if the called party is not registered; routing a session signaling and indicating subsequent signaling layer control function entities in a session signaling path to give up an interaction for a network address port translation with a media layer gateway function entity by the first signaling layer control function entity at the calling party side access domain.

When processing the session signaling, if a third signaling layer control function entity in the network domain in a session signaling path receives an indication not to perform the interaction for the network address port translation with the media layer gateway function entity, the network address port translation is given up; if the third signaling layer control function entity does not receive the indication, it further determines whether the bearer network where the third entity is located can be inter-connected directly with the bearer network where the called party is located according to the called party side information; if yes, the interaction for the network address port translation with the media layer gateway function entity is given up; otherwise, the third signaling layer control function entity interacts with the media layer gateway function entity to realize the network address port translation and to route the session signaling.

A communication method for preventing media stream circuitry in accordance with another embodiment of the present invention includes the steps of: querying by a signaling layer control function entity in a calling party access domain whether a called party is registered in the signaling layer control function entity according to a called party's identification in a session request; if the called party is registered in the signaling layer control function entity, proceeding to the next step, if the called party is not registered in the signaling layer control function entity, determining by the signaling layer control function entity whether to perform the network address port translation according to the calling party's registered information and performing subsequent procedures; and routing a session signaling and notifying subsequent signaling layer control function entities in a session signaling path to give up an interaction for a network address port translation with a media layer gateway function entity by the signaling layer control function entity.

In the above method, the signaling layer control function entity can further judges whether the calling party and the called party can be inter-connected directly according to registered information of the calling party and the called party. If they can be inter-connected directly, the interaction for the network address port translation with the media layer gateway function entity is given up; if they can not be inter-connected directly, the signaling layer control function entity determines whether to perform the network address port translation according to the registered information of the calling party.

The subsequent procedures can include: obtaining the called party side information by the signaling layer control function entity; routing the session signaling, and giving up the interaction for the network address port translation with the media layer gateway function entity when it determines that the bearer network where the signaling layer control function entity is located can be inter-connected directly with the bearer network where the called party is located according to the called party side information by the signaling layer control function entity.

In a second aspect of the present invention, a network device including a signaling processing unit for routing a session signaling and for controlling an establishment of a media stream path is provided. In accordance with one embodiment of the present invention, the network device further includes: an information obtaining unit for obtaining called party side information; and a judgment unit for determining whether a bearer network where the network device is located can be inter-connected directly with a bearer network where a called party is located according to the called party side information, and for notifying the signaling processing unit to give up an interaction for a network address port translation with a media layer gateway function entity.

In accordance with another embodiment of the present invention, the network device further includes: a first judgment unit for querying whether a called party is registered in the network device according to the called party's identification in a user's session request, for determining whether a calling party and the called party can be inter-connected directly according to registered information of the calling party and the called party, and for notifying the signaling processing unit to give up an interaction for a network address port translation with a media layer gateway function entity when it determines that the calling party and the called party can be inter-connected directly; an information obtaining unit for obtaining the called party side information; and a second judgment unit for determining whether the calling party and the called party are located in a same bearer domain, and for notifying the signaling processing unit to give up the interaction for the network address port translation with the media layer gateway function entity when it determines that the calling party and the called party are located in the same bearer domain.

The present invention has one or more of the following advantages.

After the initial signaling interaction between the calling and called parties is completed and a part of the information of the called UE belonged network is obtained, the media stream path is once again established during the subsequent session signaling procedure to separate the media stream path establishing procedure from the signaling path establishing procedure so that the network address port translation is not performed when the session signaling is routed in the inter-connected network domains and the bearer networks can be inter-connected directly, so as to avoid the media stream circuitry.

The signaling layer boarder control function entity where the calling party is located can judge whether the calling and called parties are located in the same management domain according to the called party's identification, and the NAPT translation is not performed in routing the session signaling when the calling party and the called party are located in the same management domain or the same bearer network domain so as to avoid the media stream circuitry.

According to the present invention, the media stream circuitry between the two networks which can be inter-connected is avoided as much as possible, therefore, the service quality of the media stream can be improved.

DETAILED DESCRIPTION OF THE INVENTION

In the session establishment procedure in the related art, when the signaling carrying the media stream information firstly passes a signaling layer border control function entity, the signaling layer border control function entity will interact with the media layer border gateway function entity to exchange the address information of the media stream carried in the signaling (i.e., amending the SDP). That is, the media stream will pass through the media layer boarder gateway function entity so that the media stream path is determined.

The signaling boarder control function entity mainly refers to the Proxy Application Function/Inter-working Application Function (P-AF/I-AF). The media layer boarder gateway function entity mainly refers to the Access Border Gateway Function/Interworking Border Gateway Function (A-BGF/I-BGF).

In order to avoid the media stream circuitry, when the signaling layer boarder control function entity of the present invention between the access domain and network domain processes the session signaling, it judges the inter-connection between the calling and called parties. If the calling and called parties can be inter-connected directly, the signaling layer boarder control function entity gives up the interaction for the NAPT with the media layer gateway function entity. If they cannot be inter-connected directly, the procedure is processed in the traditional way.

The inter-connecting judgments in the access domain and in the network domain can be performed independently. Preferably, they are performed in cooperation. That is, if the P-AF cannot determine whether the calling and called parties can be inter-connected directly in the access domain, the I-AFs perform the judgment processing in the network domain successively.

In the access domain, when the P-AF receives the initial session request, it can judge whether the calling party and the called party are in the same bearer domain according to the called party's identification, and further determines whether they can be inter-connected directly. Please refer to FIG. 2A, in which the flowchart of the procedure is described.

Figure 2A:
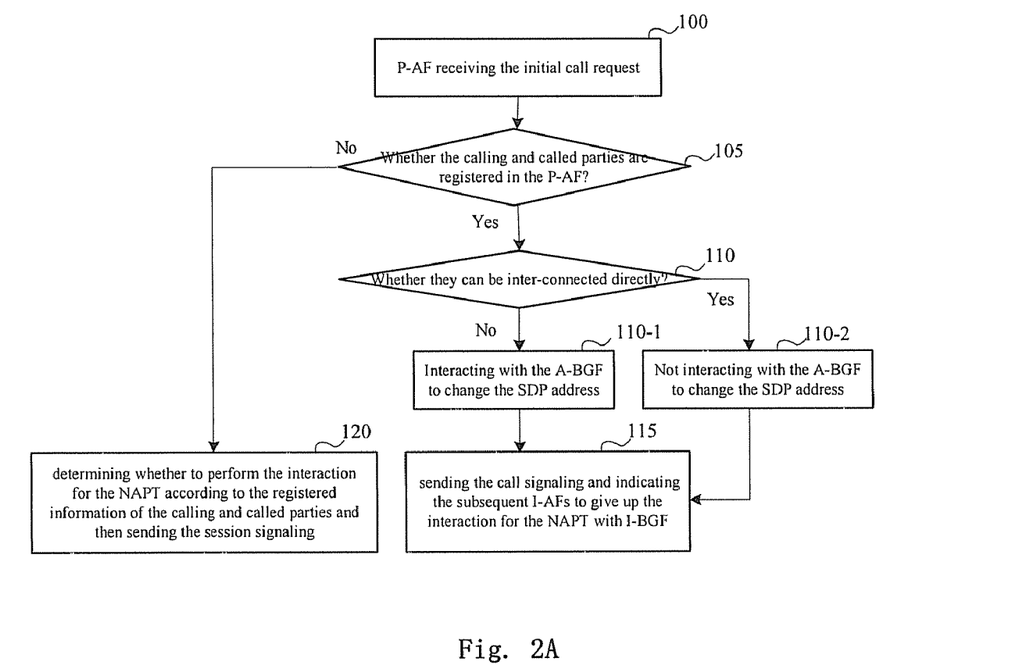
FIG. 2A is a main flowchart diagram showing an inter-connecting judgment by a P-AF of a access domain according to an embodiment of the present invention;.

In step 100, when the calling party initiates a call, the P-AF in the access domain of the calling party receives the initial call request.

In step 105, the P-AF inquires whether the called party is registered in the P-AF according to the called party's identification, such as the IMPU of the IMS network (i.e. the public user identification of the IMS network which is normally a uniform resource identifier (URI) or the E.164 number), if yes, the procedure proceeds to step 110; otherwise, the procedure proceeds to step 120.

In step 110, both the called party UE B and the calling party UE A are located in the network domain managed by the P-AF, which can determine whether the calling and called parties can be inter-connected directly according to the registered information (such as the IP address, the access network and so on) of the calling and called parties, if yes, the P-AF gives up the interaction with A-BGF for the NAPT; otherwise, the P-AF determines whether to perform the inter-action with A-BGF for the NAPT according to the registered information of the calling and called parties (the procedure is the same as that in the related art).

In step 115, the P-AF routes the session signaling and indicates the subsequent session entities to give up the interaction for the NAPT with the media gateway function entity in the session signaling. This can be realized by extending the indication information carried by the session signaling for indicating the subsequent session entities to give up the interaction for the NAPT with the media gateway.

In step 120, the P-AF determines whether to interact with the A-BGF for the NAPT according to the registered information of the calling party and to route the subsequent session signaling (which is the same as that in the related art) (the P-AF at the called party side can also perform the same procedure).

If there is no the above-mentioned judgment processing in the P-AF, even if the calling party and the called party can be inter-connected directly, the P-AF interacts with the A-BGF for the NAPT since the IP address of the access domain is different from that of the core domain.

After the P-AF in the access domain determines that the calling party and the called party are located in the same network domain managed by the P-AF, the I-AFs in the session signaling path route the session signaling directly and establish the media stream path without interacting with the I-BGF for the NAPT. When the P-AF determines that the calling party and the called party are not in the same network domain managed by the P-AF according to the called party's identification, or there is no the above-mentioned P-AF judging procedure, the establishment of the media stream path is separated from the establishment of the singling path during the session signaling processing. Firstly, the signaling interaction is performed, i.e. the call initial signaling initiated by the user terminal is directly routed to the network entity where the called party is located, and then the response message returned from the called party side is obtained and during this procedure the initial media stream path is temporarily not established. After the signaling interaction between the calling party and the called party is completed and the corresponding information of the called party side is obtained, the media stream path is established in the subsequent session signaling procedure.

The called party side information can be the information of the network entity in the network where the called party is located (as the user roams or nomadizes, it is the roaming place or nomadic place of the called party), or the information of the bearer network of the network where the called party is located, or the information of the signaling layer control function entity of the called party.

Figure 2B:
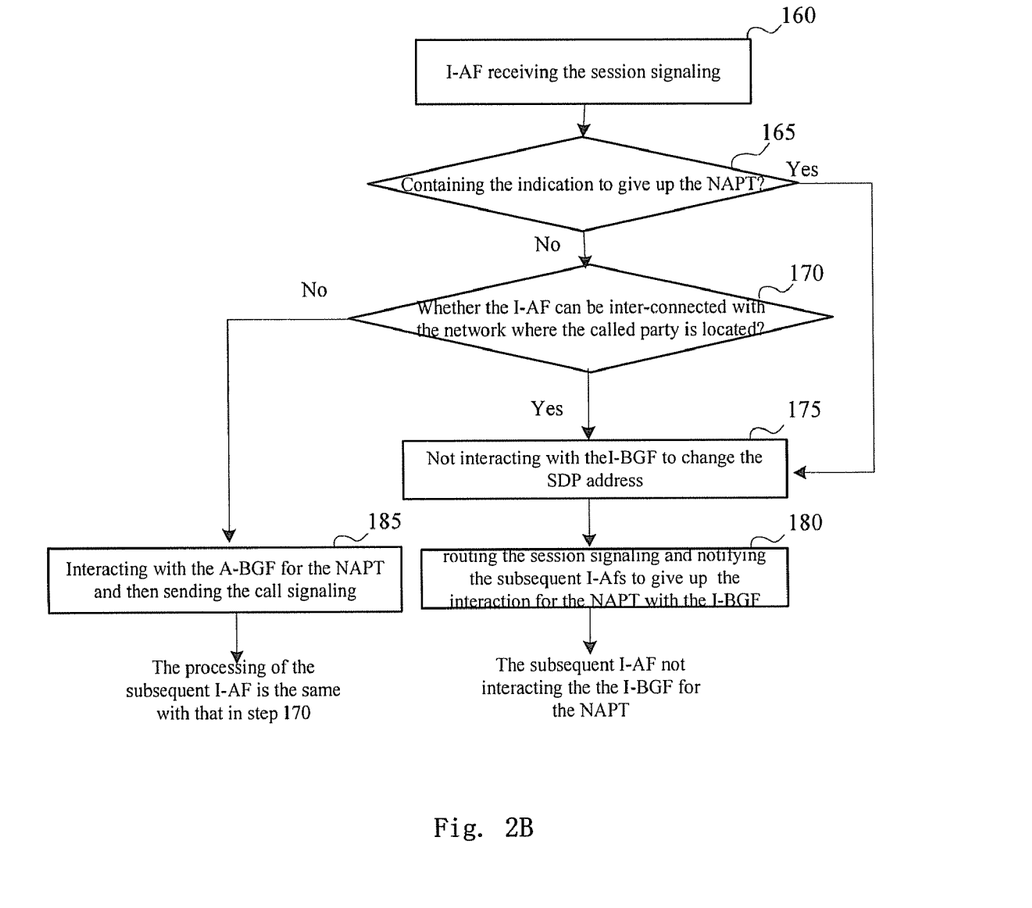
FIG. 2B is a main flowchart diagram showing an inter-connecting judgment by an I-AF of a network domain according to an embodiment of the present invention.

As shown in FIG. 2B, the flowchart of the I-AF session signaling processing is described as follows:

In step 160, the I-AF receives the session signaling.

In step 165, the I-AF judges whether the session signaling contains indication information indicating to give up the interaction for the NAPT with the media layer gateway function entity, if yes, the procedure precedes to step 175; otherwise, the procedure proceeds to step 170.

In step 170, the I-AF entity can judge the connectivity between the network where the I-AF entity is located and the one where the called party UE is located according to the network entity information, and if the two networks can be inter-connected directly, the procedure proceeds to step 175; otherwise, the procedure proceeds to step 185.

After the initial signaling interaction, the I-AF entities of the calling party or of the middle network can know a part of the information of network entities of the network where the called party UE is located, such as the uniform resource identifier (URI) or the IP address etc. of the I-CSCF (Interrogating-Call Session Control Function) in the IMS network.

The I-AF entity can perform the judgment according to the configuration information of the bearer network or according to the bearer network connectivity information obtained from the PDF (policy decision function) or according to the lookup in the Domain Name Server (DNS).

In step 175, the I-AF entity gives up (not any longer) the interaction for the NAPT with the I-BGF.

In step 180, the I-AF routes the session signaling and notifies the subsequent I-AFs/P-AFs to give up (not any longer) the interaction for the NAPT with the I-BGF through the session signaling. After this step, the subsequent I-AF entities do not interact for the NAPT with the I-BGF.

In step 185, the I-AF entity interacts with the I-BGF for NAPT, and then routes the session signaling. After this step, the subsequent I-AFs needs to perform the same judgment processing as in step 170.

For the P-AF in the called party's access domain, when it obtains the information on not interacting with the A-BGF for the NAPT from the session signaling, it further judges whether the access network where the called party is located and the core network of the called party can be inter-connected according to the registered information of the called party and if no, the interaction with the media gateway for the NAPT is needed; otherwise, the NAPT is not performed.

Next, the present invention will be explained with reference to the signaling flowchart shown in FIG. 3.

Figure 3:
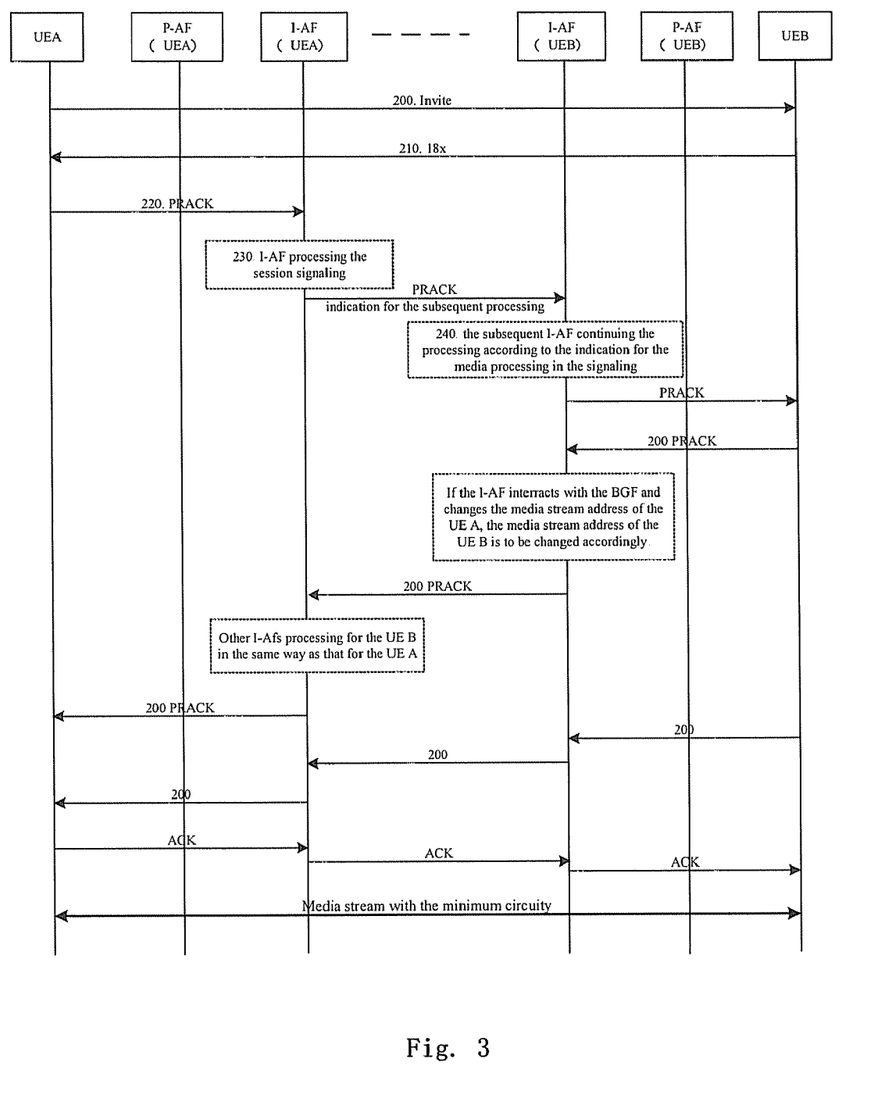
FIGS. 3, 4 and 5 are flowchart diagrams showing processing of the session signaling according to an embodiment of the present invention;.

The processing procedure of the P-AF is omitted in FIG. 3. In FIG. 3, the I-AF (UE A) represents the I-AF in which the terminal A is located, the I-AF (UE B) represents the I-AF in which the terminal B is located; and many I-AFs, not shown, can be existed between the I-AF (UE A) and the I-AF (UE B) for processing the session signaling; the following other figures are of the same reason.

In step 200, the initial signaling interaction is performed between the calling party UE A and the called party UE B, but the I-AF temporarily does not interact with the BGF for the NAPT.

In step 210, the called party side returns an 18X response message to the calling party side, which carries the URI, which is also carried in the normal session, of the I-CSCF (I-AF) of the network domain where the UE B is located.

In step 220, the calling party UE A sends a PRACK response to the I-AF (UE A).

The I-AF (UE A) can obtain the URI of the I-CSCF (I-AF) of the network domain where the UE B is located from the response message obtained in step 210. Of course, the URI can also be carried in the PRACK response and sent to the I-AF (UE A) entity in this step.

In step 230, the I-AF (UE A) entity compares the information of its network domain with the URI of the I-CSCF (I-AF) of the network domain where the UE B is located to determine whether the network where the I-AF (UE A) entity is located can directly be inter-connected with the one where the I-AF (UE B) entity is located. If yes, the I-AF (UE A) entity does not interact with the corresponding I-BGF entity for the NAPT and indicates the subsequent I-AF (UE B) etc. not to interact with the I-BGF entity for the NAPT through the backward transferred session signaling. (This embodiment only describes the example of direct inter-connecting. For the situation without direct inter-connection, the procedure can be the same as that of the related art and the NATP processing is needed. The I-AFs subsequently receive the session signaling will repeat the judgment processing in this step.)

In step 240, the I-AF (UE B) entities subsequently receiving the session signaling do not perform the interaction with the corresponding I-BGF entity for the NAPT according to the indication in the session signaling and finally. The correct UE A's media address is carried to the UE B if needing to pass some BGF. The media address in the SDP will be the address of the BGF. The word "correct" means that the media stream communication between the UE A and the UE B is guaranteed to be the minimum circuitry.

The processing on the session packets returned from the UE B to the UE A by the I-AF (UE B) and I-AF (UE A) entities, etc. is the same as the above, i.e. if the I-AF does not change the media stream address of the UE A, it does not need to change the media stream address of the UE B either. If the interaction between the I-AF and the BGF changes the media stream address of the UE A, it also needs to change the media stream address of the UE B. The subsequent procedures will not be illustrated in detail here for purpose of simplicity.

After the above processing on the session signaling, the media stream with the minimum circuitry is established between the UE A and the UE B.

When the network is not hidden, after the interaction of the initial session signaling, the P-AF entity in the calling party access domain can obtain the information of the P-AF entity in the access domain where the called party is located (if the network is hidden, the information of the called party' P-AF entity is encrypted and can not be seen), and then can determine whether the calling party and the called party are located in the same bearer domain according to the consistency of the P-AF entities of the calling party and the called party. If they are located in the same bearer domain and can be inter-connected directly, the P-AF entity and the A-BGF entity do not interact for the NAPT. Please refer to FIG. 4, in which the flowchart is described and the processing of the P-AF is omitted.

Figure 4:
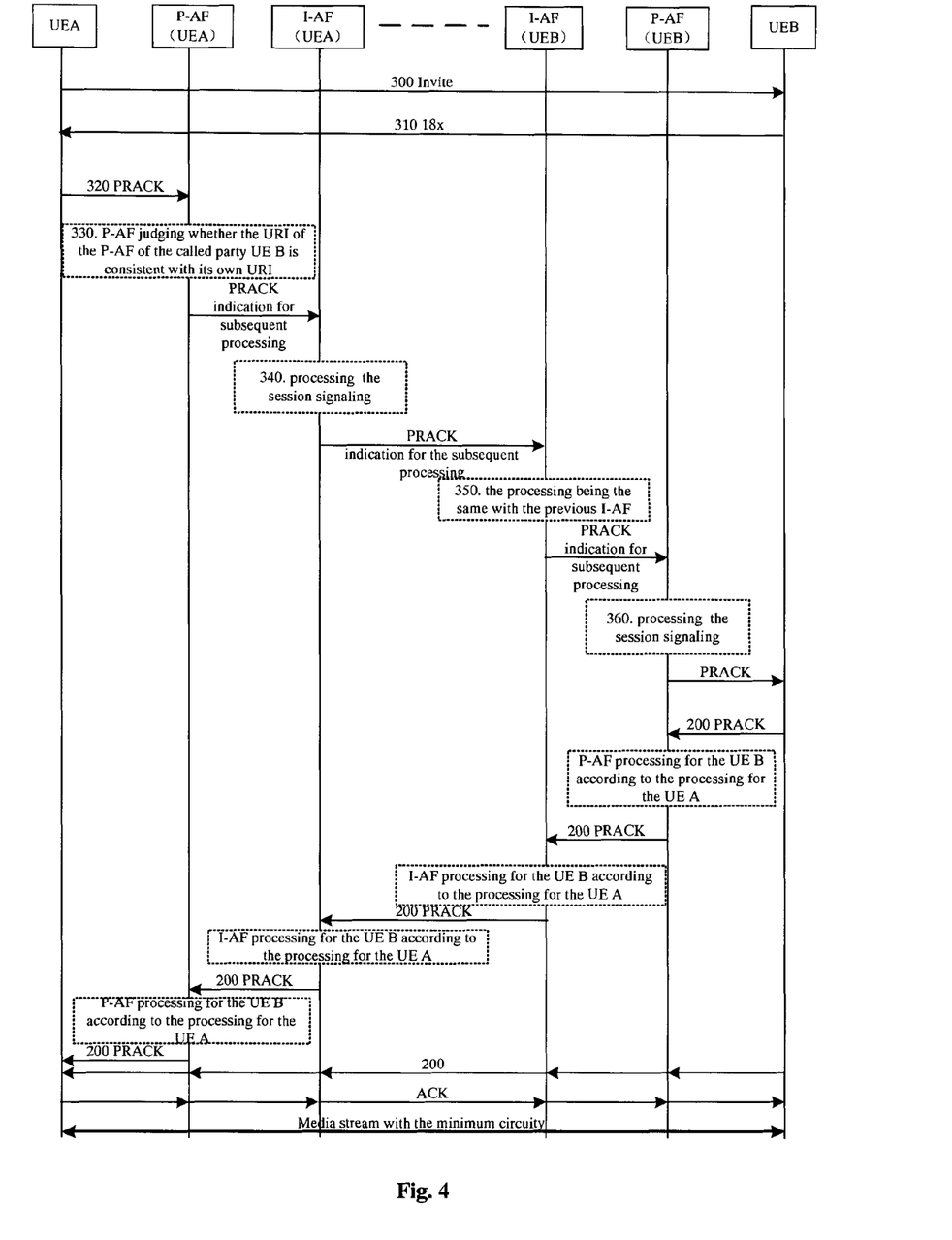

In step 300, the calling party UE A interacts with the called party UE B by sending the initial signaling, while the I-AF temporarily does not interact with the BGF for the NAPT.

In step 310, the called party side returns the 18X response message to the calling party side, which carries the URI (when the network is not hidden during the normal session, the information can be seen) of the network domain where the P-CSCF (P-AF) of the UE B is located and the URI of the I-CSCF or I-BCF (I-AF).

In step 320, the calling party sends the PRACK response to the P-AF (UE A).

In step 330, the P-AF (UE A) judges whether it is located in the same bearer domain as the P-AF (UE B) according to its URI and the URI of the P-AF (UE B) where the called party UE B is located and if yes, it determines whether they can be inter-connected directly according to the IP address segments of the UE A/UE B. If they can be inter-connected directly, the P-AF (UE A) does not perform the NAPT with the A-BGF and indicates the subsequent I-AF not to interact with the BGF for the NAPT through the session signaling. If they cannot be inter-connected directly, the P-AF (UE A) performs the NAPT with the A-BGF and indicates the subsequent I-AF not to interact with the BGF for the NAPT through the session signaling. If they do not belong to the same bearer domain, the P-AF (UE A) and the A-BGF perform the NAPT and route the session signaling (which can be the same as that of the traditional procedure).

In step 340, after the I-AF (UE A) receives the session signaling, it does not perform the NAPT with the BGF if the message indicates not to interact with the BGF for the NAPT. Otherwise, the I-AF (UE A) entity compares the corresponding information of its network domain with the URI of the I-CSCF or I-BCF (I-AF) of the network domain where the UE B is located, and determines whether the network where the I-AF (UE A) entity is located can be inter-connected with the one where the called party UE is located directly. If they can be inter-connected directly, the I-AF (UE A) entity will not interact with the I-BGF for the NAPT. If they cannot be inter-connected directly, the I-AF (UE A) entity interacts with the I-BGF for the NAPT.

In step 350 the processing of the subsequent I-AF (UE B) in the session signaling path (maybe, there are many I-AF entities in front of this I-AF entity) after it receives the session signaling is the same as that of the above-mentioned I-AF (UE A).

In step 360, after the P-AF (UE B) receives the session signaling indicating not to interact with the BGF for the NAPT, it judges whether the calling party and the called party belong to the same P-AF. If they belong to the same P-AF, it judges whether the NAPT through the A-BGF is needed according to the registered information of the UE A and UE B. If they do not belong to the same P-AF, the P-AF (UE B) determines whether the access network where the called party is located can be inter-connected with the core network where the called party is located according to the registered information of the called party so as to determine whether the NAPT is needed, and then to carry the correctly processed SDP of the UE A to the UE B.

The P-AF and I-AF receive the response message subsequently returned from the UE B to the UE A, and process it according to the processing method for the session signaling of the UE A. After the processing on the session signaling, the media stream with the minimum circuitry is established between the UE A and the UE B.

After the interaction of the initial signaling, the judgment processing performed by the P-AF entity in the access domain can be performed independently, without depending on the judgment processing of the subsequent I-AF.

In view of various scenarios of the media stream circuitry, a common solution is: during the initial session message interaction between the calling party and the called party, the message content in the response message from the called party is extended. For example, a header field is added in the SIP message and the extended information specifically describes the information of the called party's bearer network, such as the identification of the operator network domain where the called party's P-AF is located, the bearer network IP address segment, IPv4 or IPv6, etc. (the bearer network information is not limited to these, as long as the information is useful in judging whether the calling and called parties can be inter-connected directly). During the subsequent session establishment, the P/I-AF of the calling party side judges the connectivity between the calling party and called party or between the domain where the P-AF/I-AF is located and the network where the called party is located successively according to the content of the extended information, so as to determine whether to interact with the A/I-BGF for the NAPT. Please refer to FIG. 5, in which the flowchart is described and the normal processing of the P-AF is the same as that in the traditional method, that is, the P-AF determines whether to interact with the ABGF for the NAPT according to the access situations of the UE A or UE B respectively.

Figure 5:
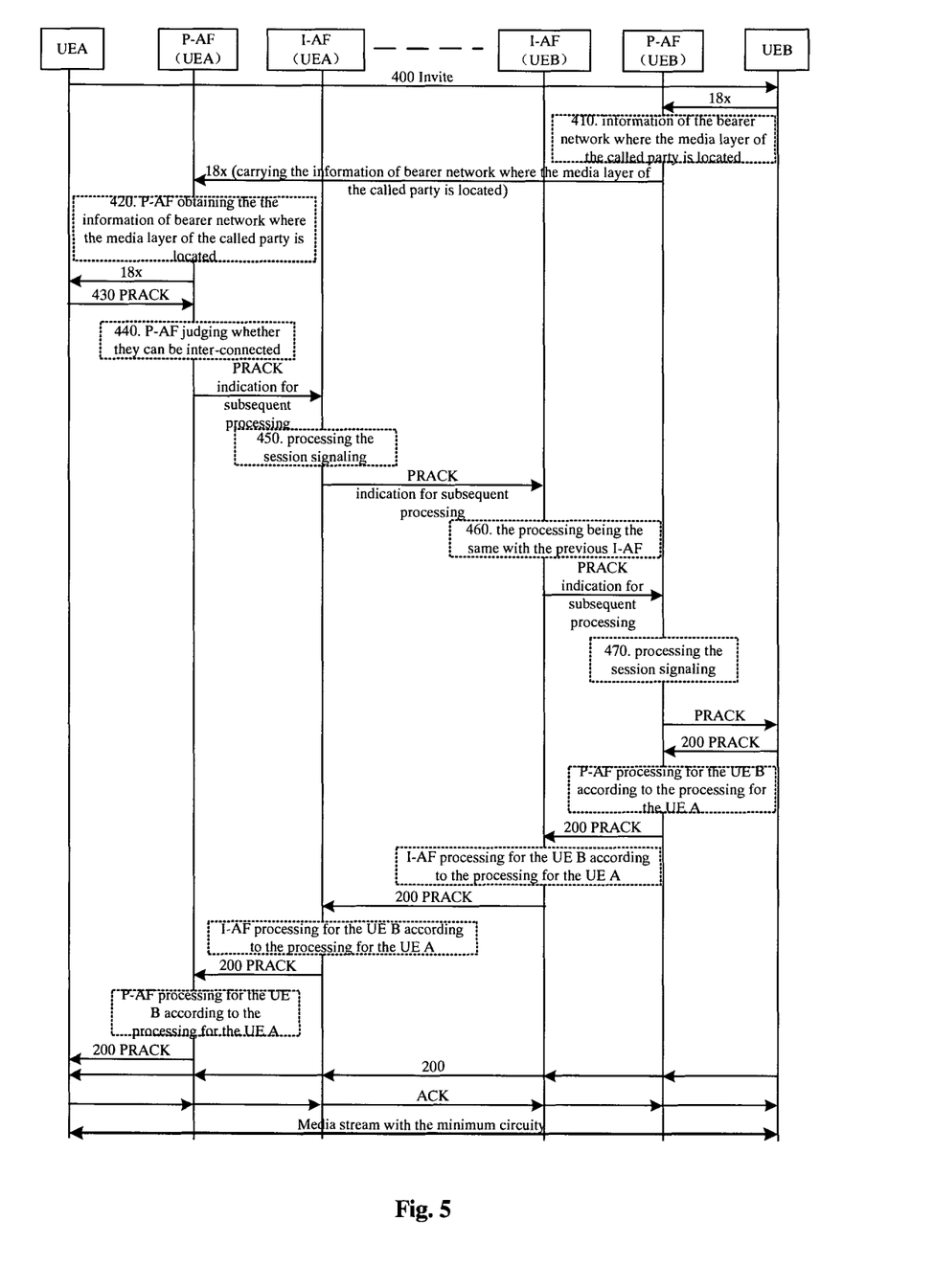

In step 400, the initial signaling interaction is implemented between the calling party UE A and the called party UE B, while the I-AF temporarily does not interact with the BGF for the NAPT.

In step 410, the added extended information of the called party side describes the information of the bearer network in which the media layer of the called party UE B is located, the extended or newly added SIP header field carries the information of the bearer network in which the media layer of the called party UE B is located, and the information is returned to the P-AF (UE A) of the calling side through the 18X message.

In step 420, the P-AF (UE A) can intercept the extended information without transmitting it to the UE A. The extended information can also be transmitted to the terminal UE A.

In step 430, the UE A sends the PRACK response to the P-AF (UE A).

In step 440, the P-AF (UE A) judges from the extended information and the bearer network information of the UE A media layer. If they can be inter-connected directly, the P-AF (UE A) does not perform the NAPT with the A-BGF, and indicates the subsequent I-AFs not to perform the NAPT. Otherwise, the normal processing is performed.

In steps 450-460, after the subsequent I-AF (UE A) and I-AF (UE B), etc. receive the session signaling indicating not to interact with the BGF for the NAPT, the NAPT processing is not performed; if the session signaling does not include such an indication, it is determined whether the network domain where the I-AF entity is located can be inter-connected directly with the one where the called party UE is located according to the carried extended information. If they can be inter-connected directly, the I-AF entity does not interact with the I-BGF entity for the NAPT and indicates the subsequent I-AF entity not to interact with the I-BGF entity for the NAPT through the session signaling; if they cannot be inter-connected directly, the I-AF entity will interact with the I-BGF entity for the NAPT.

In step 470, after the P-AF (UE B) receives the session signaling indicating not to interact with the BGF for the NAPT, it judges whether the P-AF of the calling party and that of the called party are the same P-AF. If they are the same P-AF, the P-AF (UE B) determines whether the NAPT through the A-BGF is needed according to the registered information of the UE A and UE B. If they are different P-AFs, the P-AF (B) judges whether the access network where the called party is located and the core network of the called party can be inter-connected directly according to the registered information of the called party so as to determine whether the NAPT is needed, and then to carry the correctly processed SDP of the UE A to the UE B.

The P-AF and the I-AF receive the response message returned from the UE B to UE A, and process it according to the processing method for the session signaling of the UE A. After the processing on the session signaling, the media stream with the minimum circuitry is established between the UE A and the UE B.

Whether performing the NAPT through the A-BGF/I-BGF in a session depends on various factors, including whether the bearer networks can be inter-connected, the operator control, the security and charge, etc. Even if the bearer networks can be inter-connected, the operator may force the media stream to pass through the A-BGF/I-BGF. Therefore, the solution can be combined with the above factors so as to determine whether the media stream needs to pass the A-BGF/I-BGF.

In the flowchart shown in FIG. 5, the combination of the judgment processing of the P-AF in the access domain and the judgment processing of the I-AFs in the subsequent network domains is only a preferred embodiment, and the judgment processing of the P-AF in the access domain can be performed independently.

Figure 6A:
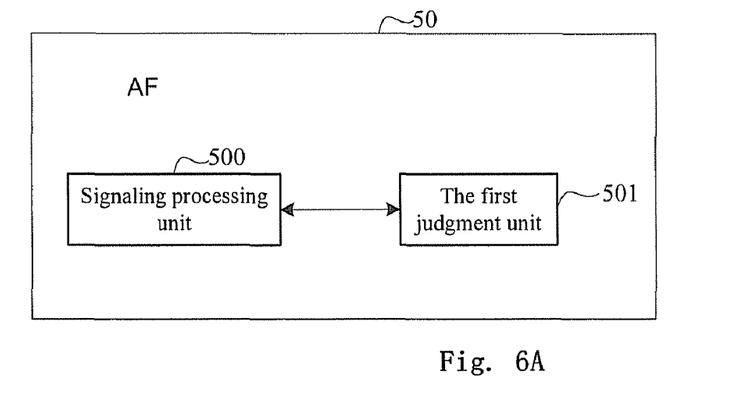
FIGS. 6A, 6B and 6C are block diagrams showing an architecture of an AF according to an embodiment of the present invention.

Based on the above-mentioned method, one embodiment of the present invention further provides the following AF entities:

As shown in FIG. 6A, the AF entity 50 may include a signaling processing unit 500 and a first judgment unit 501.

The signaling processing unit 500 is for routing the session signaling and for controlling and establishing the media stream path, and so on, so as to realize the basic functions of the AF in the related art.

The first judgment unit 501 is logically connected with the signaling processing unit 500 and is for querying whether the called party is registered in the network device according to the called party's identification in the user session request, and for judging whether the calling party and the called party can be inter-connected directly according to the registered information of the calling party and the called party. When the first judgment unit 501 determines the calling party and the called party can be inter-connected directly, it notifies the signaling processing unit 500 to give up the interaction for the NAPT and the signaling processing unit 500 also can notify the subsequent signaling layer control function entity through the session signaling.

Figure 6B:
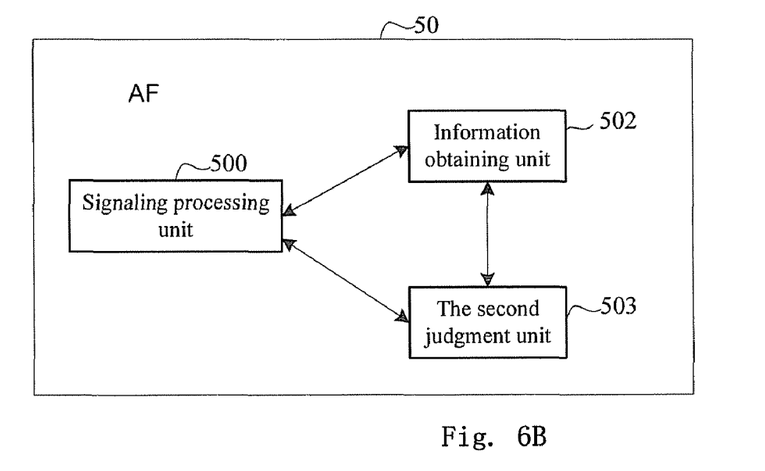

FIG. 6B shows that the AF entity 50 may include a signaling processing unit 500, an information obtaining unit 502 and a second judgment unit 503.

The signaling processing unit 500 is for routing session signaling and for controlling and establishing the media stream path so as to realize the basic functions of the AF in the related art.

The information obtaining unit 502 is for obtaining the called party side information according to the initial session request.

The second judgment unit 503 is logically connected with the signaling processing unit 500 and is for judging whether the calling party and the called party can be inter-connected directly according to the registered information of the calling party and the called party. When the first judgment unit 503 determines the calling party and the called party can be inter-connected directly, it notifies the signaling processing unit 500 to give up the interaction for the NAPT.

The signaling processing unit 500 also can notify the subsequent signaling layer control function entity through the session signaling.

Figure 6C:
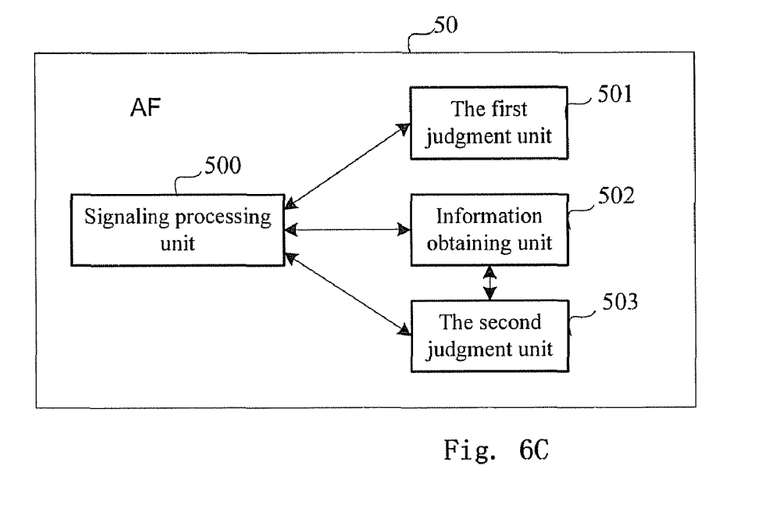

FIG. 6C shows that on the basis of the architecture as shown in FIG. 6B, the AF entity may include the first judgment unit 501 with the same function as that shown in FIG. 6A.

Furthermore, one skilled in the art can obtain other architectures of the AF according to the above-mentioned description, without any inventive labour.

The present invention is adapted to the packet service network (IMS, soft switch etc.). The P-AF can be a P-CSCF or an AGCF (Access Gateway Control Function), an ABP/IBP (Access Border Point/Internet Border Point), a SBC (Session Border Control) or an ALG (Application Layer Gateway) etc. The I-AF can be an I-BCF, an NBP (Network Border Point), an MGCF (Media Gateway Control Function) and an AGCF etc. The A/I-BGF can be various BRASs (Broadband Remote Access Server) with the NAPT function, a GGSN (Gateway GPRS Support Node), a PDSN (Packet Data Serving Node), a router, a switch, a media gateway, a TrGW (Translation Gateway), etc. The present invention can be used in both fixed and mobile networks.

The present invention also can be used in a bearer network with different IPv4 address domains, or a bearer network with different IPv4/IPv6 address formats.

Although the embodiment is described with the example of the singling layer boarder control function entity and media layer boarder control function entity, one skilled in the art can realize the present invention can be implanted by, for example, a control function entity in the network domain, which is independent with the singling layer boarder control function entity and the media layer boarder control function entity, according to the above-mentioned description. For example, the present invention can be realized by an independent NAPT signaling function entity and an independent media layer NAPT gateway, whose principle is the same and will not be illustrated in detail here.

While the invention has been particularly shown and described with reference to the preferred embodiment thereof, it will be understood by those skilled in the art that various changes in form and detail may be made therein without departing from the spirit and scope of the invention.

What is claimed is:

1. A communication method for preventing media stream circuitry, comprising:
    obtaining called party side information by a first signaling layer control function entity at a calling party side;
    routing a session signaling by the first signaling layer control function; and
    determining whether a bearer network where the first signaling layer control function entity is located can be directly inter-connected with a bearer network where a called party is located based on the called party side information,
    wherein if the bearer network where the first signaling layer control function entity is located can be directly inter-connected with the bearer network where the called party is located, then the method further comprises:
        giving up an interaction with a first media layer gateway function entity for a network address port translation by the first signaling layer control function entity; and
        instructing, by the first signaling layer control function entity, a second signaling layer control function entity to give up an interaction with a second media layer gateway function entity for a network address port translation, wherein the second signaling layer control function entity is subsequent to the first signaling layer control function entity in a session signaling path,
    wherein obtaining called party side information comprises:
        routing an initial session signaling to a network entity in a network where the called party is located, wherein the first signaling layer control function entity does not interact with the first media layer gateway function entity for the network address port translation, wherein the first media layer gateway function entity represents a border gateway with a network address port translation function, and wherein the media stream path is not temporarily established when routing the initial session signaling to the network entity; and
        obtaining the called party side information according to a returned response message.

2. The communication method according to claim 1, further comprising:
    judging the called party side information by using bearer network configuration information or bearer network connectivity information obtained from a policy decision entity by the first signaling layer control function entity, so as to determine whether the first signaling layer control function entity can be inter-connected directly with the network entity in the network where the called party is located; or querying the domain server according to the called party side information by the first signaling layer control function entity to determine whether the first signaling layer control function entity can be inter-connected directly with the network entity in the network where the called party is located.

3. The communication method according to claim 2,
    wherein the first signaling layer control function entity and the second signaling layer control function entity are border control function entities or independent network address port translation signaling function entities; and
    wherein the first media layer gateway function entity and the second signaling layer control function entity are border gateway function entities or independent media layer network address port translation gateways.

4. The communication method according to claim 1, wherein the called party side information comprises network entity information of the network where the called party is located, or bearer network information of the network where the called party is located, or information of a signaling layer control function entity where the called party is located.

5. The communication method according to claim 4, wherein the bearer network information comprises at least one of the following: an operator network domain identification, a bearer network IP address segment, an IPv4 address format, and an IPv6 address format.

6. The communication method according claim 5, further comprising:
    carrying the bearer network information by extending the response message.

7. The communication method according to claim 4,
    wherein the first signaling layer control function entity and the second signaling layer control function entity are border control function entities or independent network address port translation signaling function entities; and
    wherein the first media layer gateway function entity and the second signaling layer control function entity are border gateway function entities or independent media layer network address port translation gateways.

8. The communication method according to claim 1,
    wherein the first signaling layer control function entity and the second signaling layer control function entity are border control function entities or independent network address port translation signaling function entities; and
    wherein the first media layer gateway function entity and the second signaling layer control function entity are border gateway function entities or independent media layer network address port translation gateways.

9. The communication method according to claim 1, further comprising: if the second signaling layer control function entity does not receive an indication to give up the interaction with the second media layer gateway function entity for the network address port translation, determining whether the bearer network where the second signaling layer control function entity is located can be inter-connected directly with the bearer network where the called party is located according to the called party side information; if yes, giving up the interaction for the network address port translation with the second media layer gateway function entity; otherwise, interacting with the second media layer gateway function entity to realize the network address port translation and to route the session signaling.

10. A network device comprising a hardware processor configured to:
    route a session signaling for controlling an establishment of a media stream path;
    obtain called party side information via the session signaling;

determine whether a network where the network device is located can be inter-connected directly with a network where a called party is located based on the called party side information, wherein if network where the network device is located can be inter-connected directly with a network where a called party is located, then the processor is further configured to:

determine that a bearer network where the signaling layer control function entity is located can be directly inter-connected with a bearer network where a called party is located according to the called party side information;

give up an interaction for a network address port translation with a first media layer gateway function entity; and instruct a second signaling layer control function entity to give up an interaction with a second media layer gateway function entity for a network address port translation, wherein the second signaling layer control function entity is subsequent to the first signaling layer control function entity in a session signaling path, wherein the network device does not interact with the first media layer gateway function entity for the network address port translation before the called party side information is obtained, wherein the first media layer gateway function entity represents a border gateway with the network address port translation function, and wherein the media stream is not established before the called party side information is obtained.

11. A communication method for preventing media stream circuitry, comprising:

obtaining called party side information by a first signaling layer control function entity at a calling party side access domain by routing an initial session signaling to a network entity in a network where the called party is located, wherein the first signaling layer control function entity does not interact with a first media layer gateway function entity for a network address port translation, wherein the first media layer gateway function entity represents a border gateway with the network address port translation function, wherein the media stream path is not temporarily established while obtaining the called party side information, and wherein the called party side information is obtained according to a returned response message;

obtaining information of a second signaling layer control function entity at a called party side access domain from the called party side information;

determining, by the first signaling layer control function entity, whether the first signaling layer control function entity at the calling party side access domain and the second signaling layer control function entity at the called party side access domain belong to a common bearer domain, wherein if the first signaling layer control function entity and the second signaling layer control function entity do not belong to a common bearer domain, then the method further comprises determining by the first signaling layer control function entity whether to perform the network address port translation according to the registered information of the calling party;

wherein if the first signaling layer control function entity and the second signaling layer control function entity belong to a common bearer domain, then the method further comprises: determining whether the calling party and the called party can be inter-connected directly by the first signaling layer control function entity at the calling party side access domain, wherein if the calling party and the called party can be inter-connected directly, then the method further comprises:

giving up the interaction with the first media layer gateway function entity for a network address port translation by the first signaling layer control function entity at the calling party side access domain;

instructing, by the first signaling layer control function entity, a third signaling layer control function entity to give up an interaction with a third media layer gateway function entity for a network address port translation, wherein the third signaling layer control function entity is subsequent to the first signaling layer control function entity in a session signaling path, and wherein if the calling party and the called party cannot be inter-connected directly, then the method further comprises: determining whether to perform the network address port translation according to the registered information of the calling party by the first signaling layer control function entity.

12. The communication method according to claim 11, further comprising the following steps before the step of obtaining called party side information by the first signaling layer control function entity:

querying whether the called party is registered in the first signaling layer control function entity by the first signaling layer control function entity according to a called party's identification in a session request;

proceeding to the next step if the called party is registered, and proceeding to obtain the called party side information by the first signaling layer control function entity at the calling party side access domain if the called party is not registered; and routing a session signaling and indicating the third signaling layer control function entities in a session signaling path to give up the interaction for the network address port translation with the third media layer gateway function entity by the first signaling layer control function entity at the calling party side access domain.

13. The communication method according to claim 12, wherein the step of routing a session signaling and indicating the third signaling layer control function entities in a session signaling path to give up the interaction for the network address port translation with the third media layer gateway function entity by the first signaling layer control function entity at the calling party side access domain further comprises:

judging whether the calling party and the called party can be inter-connected directly by the first signaling layer control function entity according to registered information of the calling party and the called party; and giving up the interaction with the first media layer gateway function entity for the network address port translation if the calling party and the called party can be inter-connected directly; otherwise, determining, the first signaling layer control function entity, whether to perform the network address port translation according to the registered information of the calling party by the first signaling layer control function entity.

14. The communication method according to claim 12, further comprising:

when processing the session signaling, if the third signaling layer control function entity in the session signaling path receives an indication not to perform the interaction for the network address port translation with the third media layer gateway function entity, giving up the network address port translation; and if the third signaling layer control function entity does not receive the indication, determining whether the bearer network where the third signaling layer control function entity is located can be inter-connected directly with the network where the called party is located according to the called party side information; if yes, giving up the interaction for the network address port translation with the third media layer gateway function entity; otherwise, interacting with the third media layer gateway function entity to realize the network address port translation and to route the session signaling.

15. The communication method according to claim 14, further comprising:

after the third signaling layer control function entity determines that the networks can be inter-connected directly according to the called party side information, indicating a fourth signaling layer control function entities in the session signaling path to give up an interaction with a fourth media layer gateway function entity for a network address port translation.

16. The communication method according to claim 14, further comprising:

after the second signaling layer control function entity in the access domain where the called party is located obtains the indication information from the session message, if the second signaling layer control function entity determines that the calling party and the called party are registered in the same signaling layer control function entity in the access domain, judging whether to perform the interaction with a second media layer gateway function entity for the network address port translation according to the registered information of the calling party and the called party; otherwise, judging whether to perform the interaction with the second media layer gateway function entity for the network address port translation according to the registered information of the called party.

17. The communication method according to claim 14, further comprising:

judging the called party's corresponding information by using bearer network configuration information or bearer network connectivity information obtained from a policy decision entity, so as to determine whether the first signaling layer control function entity can be inter-connected directly with network entities in the network where the called party is located; or querying a domain server according to the called party's corresponding information to determine whether the first signaling layer control function entity can be inter-connected directly with network entities in the network where the called party is located.

18. The communication method according to claim 14, wherein the called party side information comprises network entity information of the network where the called party is located, or bearer network information of the network where the called party is located, or information of the second signaling layer control function entity where the called party is located.

19. The communication method according to claim 18, wherein the bearer network information comprises at least one of the following: an operator network domain identification, a bearer network IP address segment, an IPv4 address format, and an IPv6 address format.

20. The communication method according to claim 19, further comprising:

carrying the bearer network information by extending the response message.

21. The communication method according to claim 11, further comprising:

when processing the session signaling, if the third signaling layer control function entity in the session signaling path receives an indication not to perform the interaction for the network address port translation with the third media layer gateway function entity, giving up the network address port translation; and if the third signaling layer control function entity does not receive the indication, determining whether the bearer network where the third signaling layer control function entity is located can be inter-connected directly with the network where the called party is located according to the called party side information; if yes, giving up the interaction for the network address port translation with the third media layer gateway function entity; otherwise, interacting with the third media layer gateway function entity to realize the network address port translation and to route the session signaling.

22. The communication method according to claim 21, further comprising:

after the third signaling layer control function entity determines that the networks can be inter-connected directly according to the called party side information, indicating a fourth signaling layer control function entities in the session signaling path to give up an interaction with a fourth media layer gateway function entity for a network address port translation.

23. The communication method according to claim 21, further comprising:

after the second signaling layer control function entity in the access domain where the called party is located obtains the indication information from the session message, if the second signaling layer control function entity determines that the calling party and the called party are registered in the same signaling layer control function entity in the access domain, judging whether to perform the interaction with a second media layer gateway function entity for the network address port translation according to the registered information of the calling party and the called party; otherwise, judging whether to perform the interaction with the second media layer gateway function entity for the network address port translation according to the registered information of the called party.

24. The communication method according to claim 21, further comprising:

judging the called party's corresponding information by using bearer network configuration information or bearer network connectivity information obtained from a policy decision entity, so as to determine whether the first signaling layer control function entity can be inter-connected directly with network entities in the network where the called party is located; or querying a domain server according to the called party's corresponding information to determine whether the first signaling layer control function entity can be inter-connected directly with network entities in the network where the called party is located.

25. The communication method according to claim 21, wherein the called party side information comprises network entity information of the network where the called party is located, or bearer network information of the network where the called party is located, or information of the second signaling layer control function entity where the called party is located.

26. The communication method according to claim 25, wherein the bearer network information comprises at least one of the following: an operator network domain identification, a bearer network IP address segment, an IPv4 address format, and an IPv6 address format.

27. The communication method according to claim 26, further comprising:
    carrying the bearer network information by extending the response message.

28. A communication method for preventing media stream circuitry, comprising:
    querying, by a first signaling layer control function entity in a calling party access domain, whether a called party is registered in the first signaling layer control function entity according to a called party's identification in a session request,
    wherein if the called party is registered in the first signaling layer control function entity, then the method further comprises:
    routing a session signaling, and
    instructing, by the first signaling layer control function entity, a second signaling layer control function entity to give up an interaction for a network address port translation with a second media layer gateway function entity, wherein the second signaling layer control function entity is subsequent to the first signaling layer control function entity in a session signaling path,
    wherein if the called party is not registered in the first signaling layer control function entity, then the method further comprises:
        determining, by the first signaling layer control function entity in the calling party access domain, whether to perform a network address port translation according to the calling party's registered information;
        obtaining, by the first signaling layer control function entity, the called party side information by routing an initial session signaling to a network entity where the called party is located, wherein the first signaling layer control function entity does not interact with the first media layer gateway function entity for the network address port translation, wherein the first media layer gateway function entity represents a border gateway with the network address port translation function, wherein the media stream path is not temporarily established during the process, and wherein the called party side information is obtained according to a returned response message;
        routing the session signaling;
        giving up the interaction for the network address port translation with the first media layer gateway function entity when the first signaling layer control function entity determines that the bearer network where the first signaling layer control function entity is located can be inter-connected directly with the bearer network where the called party is located according to the called party side information; and
        instructing, by the first signaling layer control function entity, the second signaling layer control function entity to give up the interaction with the second media layer gateway function entity for a network address port translation.

29. The communication method according to claim 28, further comprising:
    when processing the session signaling, if the second signaling layer control function entity receives an indication not to perform the interaction for the network address port translation with the second media layer gateway function entity, giving up the network address port translation; and
    if the second signaling layer control function entity does not receive the indication, determining whether the bearer network where the second signaling layer control function entity is located can be inter-connected directly with the bearer network where the called party is located according to the called party side information; if yes, giving up the interaction for the network address port translation with the second media layer gateway function entity; otherwise, interacting with the second media layer gateway function entity to realize the network address port translation and to route the session signaling.

30. The communication method according to claim 29, further comprising:
    after a third signaling layer control function entity in the access domain where the called party is located obtains the indication information from the session message, if the third signaling layer control function entity determines that the calling party and the called party are registered in the same signaling layer control function entity in the access domain, judging whether to perform the interaction with a third media layer gateway function entity for the network address port translation according to the registered information of the calling party and the called party; otherwise, judging whether to perform the interaction with the third media layer gateway function entity for the network address port translation according to the registered information of the called party.

31. A network device comprising a hardware processor configured to:
    route, by a first signaling layer control function entity, a session signaling for controlling an establishment of a media stream path;
    obtain the called party side information, wherein the media stream is not temporarily established during the process of obtaining the called party side information, wherein the network device does not interact with a first media layer gateway function entity for the network address port translation, wherein the first media layer gateway function entity represents a border gateway with a network address port translation function during the process of obtaining the called party side information;
    query whether a called party is registered in the network device according to a called party's identification in a user's session request; and
    determine whether a calling party and the called party can be inter-connected directly according to registered information of the calling party and the called party,
    wherein if the calling party and the called party can be inter-connected directly, then the processor is further configured to:
        give up an interaction for a network address port translation with the first media layer gateway function entity; and
        instruct a second signaling layer control function entity to give up an interaction with a second media layer gateway function entity for a network address port translation, wherein the second signaling layer control function entity is subsequent to the first signaling layer control function entity in a session signaling path.

32. The network device according to claim 31, is further configured to:
determine whether the calling party and the called party are located in a common bearer domain, and give up the interaction for the network address port translation with the first media layer gateway function entity when determining that the calling party and the called party are located in the same bearer domain.

* * * * *